United States Patent Office 3,798,292
Patented Mar. 19, 1974

3,798,292
PESTICIDALLY ACTIVE O-ETHYL-O-PHENYL OR NAPHTHYL-S-(2-ALKOXYETHYL) PHOSPHOROTHIONOTHIOLATES
Shigeo Kishino, Akio Kudamatsu, and Kozo Shiokawa, Tokyo, Japan, assignors to Bayer Aktiengesellschaft, Leverkusen, Germany
No Drawing. Filed Apr. 22, 1971, Ser. No. 136,584
Claims priority, application Japan, Apr. 30, 1970, 45/36,305
Int. Cl. A01n 9/36; C07f 9/18
U.S. Cl. 260—950                                    11 Claims

ABSTRACT OF THE DISCLOSURE

O-ethyl-S-(2-alkoxyethyl)-dithiophosphoric acid phenyl or naphthyl esters, i.e. O-ethyl-S-(2-alkoxyethyl)-O-optionally substituted phenyl or naphthyl-phosphorothionothiolates, of the formula $$\underset{ROCH_2CH_2S}{\overset{C_2H_5O}{\diagdown}}\overset{S}{\underset{\|}{P}}-O-X \qquad (I)$$

in which
R is a lower alkyl radical, and
X is a group of the formula (IIa) phenyl-$Y_m$ or (IIb) naphthyl-$Y_m$ in which
Y is a halogen atom or a lower alkyl, lower alkoxy, lower alkylmercapto, lower alkylsulfinyl, nitro, cyano or phenyl group, and
m is 0, 1, 2 or 3, which possess insecticidal, acaricidal and nematocidal properties.

---

The present invention relates to and has for its objects the provision of particular new O-ethyl-S-(2-alkoxyethyl)-dithiophosphoric acid phenyl or naphthyl esters, i.e. O-ethyl-S-(2-alkoxyethyl)-O-optionally substituted phenyl or naphthylphosphorothionothiolates, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

In an agriculture, especially the cultivation of rice-plants, the damage caused by larvae of insects belonging to the Lepidoptera, such as the rice stem borer (*Chilo suppressalis*) and yellow rice borer (*Tryporyza incertulas*), and mites is a serious problem.

Much research has been directed to the control of these harmful creatures but only several pesticides among commercially available pesticides are effective against them; almost all of these pesticides comprise organic phosphorous compounds. Further, since the same insecticides have been used in great amounts, there has been a tendency for the harmful insects to acquire resistance to these insecticides.

The present invention provides phosphoric acid esters of the general formula:

$$\underset{ROCH_2CH_2S}{\overset{C_2H_5O}{\diagdown}}\overset{S}{\underset{\|}{P}}-O-X \qquad (I)$$

in which
R is a lower alkyl radical, and
X is a group of the formula (IIa) phenyl-$Y_m$ or (IIb) naphthyl-$Y_m$ in which
Y is a halogen atom or a lower alkyl, lower alkoxy, lower alkylmercapto, lower alkylsulfinyl, nitro, cyano or phenyl group, and
m is 0, 1, 2 or 3.

Although Y may be a fluorine or iodine atom, the preferred halogens are chlorine and bromine. Preferred lower alkyl and alkoxy groups include those with an alkyl moiety of 1 to 4 carbon atoms, namely methyl, ethyl, n- and iso-propyl and n-, iso-, sec.- and tert.-butyl.

It is known from Dutch Pat. No. 686844 that the compound of the formula $$\underset{C_2H_5S\,C_2H_4S}{\overset{C_2H_5O}{\diagdown}}\overset{O}{\underset{\|}{P}}-O-\!\!\left\langle\!\!\!\begin{array}{c}\\\end{array}\!\!\!\right\rangle\!\!-Cl \qquad (A)$$

exhibits insecticidal and fungicidal activity.

When the compounds of this invention are compared with known compounds having analogous structures and compounds having similar directions of biological activity, the compounds of this invention are characterized by substantially improved effects and very low toxicity to warm-blooded animals, and hence, they are of great utility The compounds of this invention can be used for controlling harmful insects of a broad range such as harmful sucking insects, biting insects and plant parasites.

They are especially effective as pesticides against insects harmful to agriculture, such as insects belonging to the Coleoptera, Lepidoptera, Aphidae, Orthoptera, Isoptera and Acarina as well as nematodes living on plant and soil, and they can be used as agents for protecting plants from such creatures.

Harmful insect pests contemplated herein include Coleoptera such as *Sitophilus oryzae* (rice weevil), *Tribolium castaneum* (rustred flour beetle), *Epilachna vigintioctopunctata* (28-spotted lady beetle), *Agriotes fusciocollis* (barley wireworm), and *Anomala rufocuprea* (soy bean beetle), Lepidoptera such as *Lymantria dispar* (gypsy moth), *Malacosoma neustria testacea* (tent caterpillar), *Pieris rapae crucivora* (common cabbage worm), *Prodenia litura* (tobacco cutworm), *Chilo suppressalis* (rice stem borer), *Adoxophyes orana* (smaller tea tortrix) and *Ephestia cautella* (almond moth), Hemiptera such as *Nephotettix cincticeps* (green rice leafhopper), *Nilaparvata lugens* (brown planthopper), *Pseudococcus comstocki* (comstock mealybug), *Unaspis yanonensis* (arrowhead scale), *Myzus persicae* (green peach aphid), *Aphis pomi* (apple leaf-curling aphid), and *Rhopalosiphum psendobrassicae*, (turnip aphid), Orthoptera such as *Blatella germanica* (German cockroach), *Periplaneta americana* (American cockroach) and *Cryllotalpa africana* (African mole cricket), Isoptera such as *Leucotermes speratus* (Japanese termite) and Diptera such as *Musca vicina* (house fly), *Aedes aegypti* (yellow fever mosquito), *Hylemia platura* (seed-corn maggot), *Culex pipiens pallens* (common mosquito), *Anopheles sinensis* (malaria mosquito) and *Culex tritaeniorhynchus* (Japanese encephalitis mosquito).

Harmful pests of the Acarina include *Tetranychus telarius* (two-spotted spider mite or carmine mite), *Panon-*

*ychus citri* (citrus red mite) and *Aculus pelekassi* (Japanese citrus rust mite).

Harmful nematodes include *Meloidogyne incognita acrita* (southern root-knot nematode), *Aphelenchoides besseyi* (rice white-tip nematode) and *Heterodera glycines* (soy bean cyst nematode).

The compounds of this invention exhibit a more pronounced insecticidal activity than analogous compounds against insects belonging to the Lepidoptera, whose control has been difficult by the conventional insecticides. Further, they exhibit a very high insecticidal activity against insects which have acquired resistance to the phosphorous-compound insecticides of the prior art. Still further, they are effective for controlling rice stem borers. The compounds of the invention have a very low toxicity and, in particular, do not exhibit such an acute toxicity to humans as is possessed by parathion and methylparathion.

Nevertheless, the insecticidal activity of the compounds of this invention is comparable or superior to that of parathion and, therefore, they can safely be used as agricultural chemicals.

The present invention also provides a process for the preparation of a compound of the Formula I in which (a) a thionophosphoric acid diester halide of the general formula

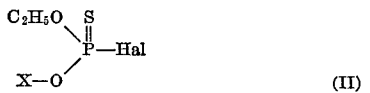

(II)

is reacted with a mercaptan of the general formula $$M-SCH_2CH_2OR \quad (III)$$

or (b) a compound of the general formula

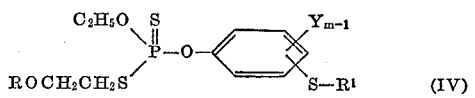

(IV)

is reacted with a suitable oxidizing agent, preferably hydrogen peroxide, in which general formulae Hal is a halogen, especially a chlorine atom,
$R^1$ is lower alkyl group,
M is a hydrogen atom or a metal equivalent, and
R, Y and $m$ are as defined above.

Preferably, R is a $C_1$–$C_4$ alkyl radical, namely methyl, ethyl, n- or iso-propyl or n-, iso-, sec.- or tert.-butyl, and X is phenyl or naphthyl radical preferably substituted, singly or in admixture, with a fluorine, chlorine, bromine or iodine atom, cyano, nitro or phenyl radical or an alkyl, alkoxy, alkylmercapto or alkylsulfinyl radical of 1 to 4 carbon atoms.

Suitable thionophosphoric acid diester monohalides of the General Formula II include the following:

O-ethyl-O-phenyl-,
O-ethyl-O-(4-chlorophenyl)-,
O-ethyl-O-(2,4-dichlorophenyl)-,
O-ethyl-O-(2,4,5-trichlorophenyl)-,
O-ethyl-O-(4-bromophenyl)-,
O-ethyl-O-(2,5-dichloro-4-bromophenyl)-,
O-ethyl-O-(4-tert-butylphenyl)-,
O-ethyl-O-(3,4-dimethylphenyl)-,
O-ethyl-O-(2-chloro-4-tert-butylphenyl)-,
O-ethyl-O-(4-methoxyphenyl)-,
O-ethyl-O-(4-methylmercaptophenyl)-,
O-ethyl-O-(2-methyl-4-methylmercaptophenyl)-,
O-ethyl-O-(3-methyl-4-methylmercaptophenyl)-,
O-ethyl-O-(4-methylsulfinylphenyl)-,
O-ethyl-O-(3-methyl-4-methylsulfinylphenyl)-,
O-ethyl-O-(4-nitrophenyl)-,
O-ethyl-O-(3-chloro-4-nitrophenyl)-,
O-ethyl-O-(3-methyl-4-nitrophenyl)-,
O-ethyl-O-(4-cyanophenyl)-,
O-ethyl-O-(4-biphenyl)-,
O-ethyl-O-(α-naphthyl)-,
O-ethyl-O-(2,4-dichloro-α-naphthyl)-, and
O-ethyl-O-(1-bromo-β-naphthyl)-thionophosphoric acid chloride.

As examples of the 2-alkoxyethylmercaptans of the General Formula III, the following may be cited: 2-methoxyethylmercaptan, 2-ethoxyethylmercaptans, 2-n-(or isopropoxyethylmercaptan, and 2 - (n-butoxy)ethylmercaptan.

In the synthesis of the compounds of the Formula I according to the above method, the reaction is preferably effected in a solvent, which term herein includes a mere diluent. For this purpose any inert solvent may be used.

Suitable solvents include water; aliphatic, alicyclic, and aromatic hydrocarbons which may be chlorinated, such as hexane, cyclohexane, petroleum ether, ligroin, benzene, toluene, xylenes, methylene chloride, chloroform, carbon tetrachloride, mono-, di- and tri-chloroethylenes, and chloro-benzene; ethers such as diethyl ether, methyl ethyl ether, di-iso-propyl ether, dibutyl ether, ethylene oxide, dioxane and tetrahydrofurane; ketones such as acetone, methyl ethyl ketone and methylisobutyl ketone; nitriles such as acetonitrile, propionitrile and acrylonitrile; alcohols such as methanol, ethanol, isopropanol, butanol and ethylene glycol; esters such as ethyl acetate and amyl acetate; acid amides such as dimethyl formamide and dimethyl acetamide; and sulfoxides and sulfones such as dimethyl sulfoxide and sulfolane.

This method may be carried out in the presence of an acid-binder according to need, usually when M is a hydrogen atom. As the acid-binder there may be used an hydroxide, carbonate or alcoholate of an alkali metal or a tertiary amine such as triethylamine, diethylaniline or pyridine.

When the reaction is carried out in the absence of an acid-binder, the intended product of high purity can be obtained in high yield by first forming a salt, preferably an alkali metal salt, of the appropriate alkoxyethylmercaptan and then reacting the salt with the appropriate phosphoric acid diester monohalide.

In this method, the reaction (a) may be effected at temperatures within a fairly broad range, but generally the reaction is carried out at a temperature of from about —20° C. to the boiling point of the reaction mixture, preferred temperatures being in the range of about 0° C. to 100° C. The reaction may also be carried out under reduced or increased pressure, although the use of normal pressure is preferred.

The process variant (b) is, of course, suitable for the preparation only of those compounds of the Formula I in which X is a phenyl group substituted by an alkylsulfinyl group, with $m$ being, therefore, at least 1.

The reaction of process variant (b) is preferably effected in a solvent, for example one of those mentioned above, and the oxidant is conveniently aqueous hydrogen peroxide.

The reaction may be effected at temperatures within a fairly broad range, but preferably the reaction is effected at 0 to 100° C.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations, preparations or compositions, e.g. conventional pesticide formulations, preparations or compositions such as solutions, emulsions, suspensions, emulsifiable concentrates, wettable powders, soluble powders, oils, aerosols, pastes, fumigating powders, dusting powders, granules, pellets and tablets, etc. These are formulated or prepared in known manner, for instance by mixing the active compounds with conventional pesticide dispersible liquid or solid diluent, carriers or extenders optionally with the use of carrier vehicle assistants, e.g. conventional pesticide surface-active agents, including emulsifying agents adhesive agent and/or dispersing agents, whereby, for example, in the case where water is used as diluent, organic solvents and/or surfactants may be added as auxiliary solvents. The following may be chiefly considered for use as conventional carrier vehicles for this purpose: aerosol propellants which are gaseous at normal temperatures and pressure, such as Freon; inert dispersible liquid diluent carriers, including inert organic solvents, such as aromatic hydrocarbons (e.g. benzene, toluene, xylene, aromatic naphtha, dimethyl naphthalene, etc.), halogenated, especially chlorinated aromatic hydrocarbons (e.g. chlorobenzenes, etc.), aliphatic hydrocarbons (e.g. benzine, cyclohexane, paraffins, petroleum fractions), chlorinated aliphatic hydrocarbons (e.g. methylene chloride, ethylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, methylethyl ketone, cyclohexanone, etc.) and/or water; as well as inert dispersible finely divided solid carriers, such as ground natural minerals (e.g. clays, talc, pyrophyllite, mica, gypsum, calcite, vermiculite, dolomite, apatite, calcium or magnesium lime, diatomaceous earth, inorganic salts i.e. calcium carbanate, pumice, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic and/or cationic emulsifying agents (e.g. polyethyleneoxide esters of fatty acids, polyethylene oxide ethers of fatty alcohols, alkyl sulfonates, aryl sulfonates, alkyl dimethyl benzyl ammonium chloride, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles, optionally with the use of carrier vehicle assistants and/or with other known compatible active agents, especially plant protection agents, such as other insecticides, acaricides, nematocides, fungicides, bactericides, herbicides, rodenticides, fertilizers or plant growth-regulating agents, etc., if desired, or in the form of particular dosage preparations for specific application made therefrom, such as solutions, emulsions, suspensions, powders, pastes, and granules which are thus ready for use.

As concerns commercially marketed formulations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.001–5%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.001–95%, by weight of the mixture.

The amount of active compound applied per unit area is usually about 150 to 10,000 grams, preferably 400 to 6000 grams of active compound per hectare. However, in special cases, it may be possible to use more or less, sometimes such variations may be required.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 150 to 10,000 g./hectare preferably 400 to 6000 g./hectare, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of corresponding (a) such insects, (b) such acarids, and (c) the corresponding habitat thereof, i.e. the locus to be protected, a correspondingly combative or toxic amount, i.e. an arthropodicidally, especially insecticidally or acaridiallly, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

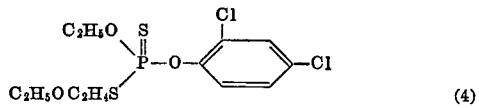
(4)

27 g. of 2-ethoxyethylmercaptan sodium salt were added to 100 ml. of acetonitrile to make a suspension. The suspension was stirred vigorously at a temperature of 5–10° C. and 61 g. of O-ethyl-O-(2,4-dichlorophenyl) thionophosphoric acid chloride were added thereto dropwise. The temperature was then gradually raised to 70° C., and the solution was stirred for 3 hours to complete the reaction. Acetonitrile was removed from the mixture by distillation and the residue was dissolved in benzene, washed with water and 1% sodium carbonate and dried over anhydrous sodium sulfate. Benzene was distilled off and there were obtained 58 g. of O-ethyl-O-(2,4-dichlorophenyl) - S - (2-ethoxyethyl)phosphorothionothiolate of B.P. 135–136° C./0.01 mm. Hg and $n_D^{20}$ 1.5633. This compound is identified as Compound No. 4 hereinafter.

EXAMPLE 2

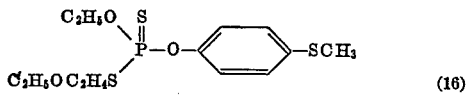
(16)

4.8 g. of sodium metal and 22 g. of 2-ethoxyethylmercaptan were added to 150 ml. of toluene and the sodium was dissolved by heating.

After the solution had cooled down, 56.5 g. of O-ethyl-O-(4-methylmercaptophenyl) thionophosphoric acid chloride were adedd thereto dropwise. After completion of the addition, the solution was washed with water and 1% sodium carbonate, and then the solution was dried over anhydrous sodium sulfate. Toluene was distilled off and there were obtained 56.5 g. of O-ethyl-O-(4-methylmercaptophenyl)-S-(2-ethoxyethyl) phosphorothionithiolate of refractive index $n_D^{20}$ 1.5757. This compound is hereinafter identified as Compound No. 16.

EXAMPLE 3

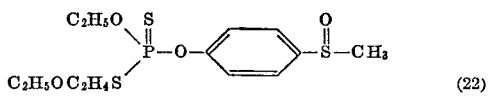
(22)

35 g. of O-ethyl-O-(4-methylmercaptophenyl)-S-(2-ethoxyethyl) phosphorothionothiolate were dissolved in 150 ml. of methyl alcohol. A few drops of 50% sulfuric acid were added to the solution and then, at 5°–10° C., 12 g. of 30% aqueous hydrogen peroxide were added thereto dropwise. The solution was stirred for 1 hour after the completion of the addition, followed by 3 hours' stirring at 40° C. Most of the methyl alcohol was removed from the reaction mixture by distillation and the residue was dissolved in benzene, washed with water and 1% sodium carbonate and dried over anhydrous sodium sulfate. Distillation of benzene gave 32 g. of O-ethyl-O-(4-methylsulfinylphenyl)-S-(2 - ethoxyethyl) phosphorothionothiolate of refractive index $n_D^{20}$ 1.5738. This compound is hereinafter identified as Compound No. 22.

EXAMPLE 4

The following compounds can be prepared by methods analogous to those of Examples 1–3.

TABLE 1

$$\begin{array}{c} C_2H_5O \diagdown \overset{S}{\underset{\|}{P}} - O - X \\ ROCH_2CH_2S \diagup \end{array} \qquad (I)$$

| Compound number | R | X | Boiling point, °C./mm. Hg | Index of refraction $n_D^{20}$ |
|---|---|---|---|---|
| 1 | $C_2H_5$ | —⟨⟩ | 150–152/0.07 | 1.5474 |
| 2 | $C_2H_5$ | —⟨⟩—Cl | 135–138/0.02 | 1.5549 |
| 3 | $CH_3$ | —⟨⟩—Cl (Cl ortho) | 148–150/0.05 | 1.5718 |
| 5 | n-$C_3H_7$ | Same as above | 165–168/0.05 | 1.5574 |
| 6 | iso-$C_3H_7$ | ....do | 155–158/0.07 | 1.5562 |
| 7 | n-$C_4H_9$ | ....do | 150–151/0.1 | 1.5540 |
| 8 | $C_2H_5$ | —⟨⟩—Cl (2,4-diCl) | 134–135/0.01 | 1.5721 |
| 9 | $C_2H_5$ | —⟨⟩—Br | 150–152/0.1 | 1.5680 |
| 10 | $C_2H_5$ | —⟨⟩—Br (2,4-Cl,Br) | 161–164/0.1 | 1.5861 |
| 11 | $C_2H_5$ | —⟨⟩—$C_4H_9$-tert | 150–154/0.1 | 1.5370 |
| 12 | $C_2H_5$ | —⟨⟩—$CH_3$ (3,4-diCH3) | 155–157/0.1 | 1.5491 |
| 13 | $C_2H_5$ | —⟨⟩—$C_2H_9$-tert (Cl) | .............. | 1.5424 |
| 14 | $C_2H_5$ | —⟨⟩—$OCH_3$ | 145–148/0.05 | 1.5497 |
| 15 | $CH_3$ | —⟨⟩—$SCH_3$ | .............. | 1.5811 |
| 17 | n-$C_3H_7$ | Same as above | .............. | 1.5685 |
| 18 | iso-$C_3H_7$ | ....do | .............. | 1.5676 |
| 19 | n-$C_4H_9$ | ....do | .............. | 1.5609 |
| 20 | $C_2H_5$ | —⟨⟩—$SCH_3$ ($CH_3$) | .............. | 1.5731 |

TABLE 1—Continued

| Compound number | R | X | Boiling point, °C./mm. Hg | Index of refraction $n_D^{20}$ |
|---|---|---|---|---|
| 21 | $C_2H_5$ | 4-(SCH₃)-3-CH₃-phenyl | --- | 1.5756 |
| 23 | $C_2H_5$ | 4-(S(O)CH₃)-3-CH₃-phenyl | --- | 1.5728 |
| 24 | $C_2H_5$ | 4-NO₂-phenyl | --- | 1.5610 |
| 25 | $C_2H_5$ | 4-NO₂-3-Cl-phenyl | --- | 1.5698 |
| 26 | $C_2H_5$ | 4-NO₂-3-CH₃-phenyl | --- | 1.5557 |
| 27 | $C_2H_5$ | 4-CN-phenyl | --- | 1.5598 |
| 28 | $C_2H_5$ | 4-phenyl-phenyl (biphenyl) | (1) | |
| 29 | $C_2H_5$ | naphthyl | 170–172/0.1 | 1.5960 |
| 30 | $C_2H_5$ | dichloronaphthyl | --- | 1.6090 |
| 31 | $C_2H_5$ | bromonaphthyl | --- | 1.6174 |

1 42–43.5° C. (melting point).

EXAMPLE 5

15 parts of Compound 16, 80 parts of diatomaceous earth and clay and 5 parts of the emulsifier "Runnox" (product of Toho Kagaku Kogyo K. K., Japan) are ground and mixed together to form a wettable powder. It is diluted with water for actual application [diatomaceous earth and clay (3:2), "Runnox": polyoxyethylenealkylarylether].

EXAMPLE 6

30 parts of Compound 2, 30 parts of xylene, 30 parts of "Kawakazol" (product of Kawasaki Kasel Kogyo K. K., Japan), and 10 parts of the emulsifier "Sorpol" (product of Toho Kagaku Kogyo K. K., Japan) are mixed with stirring to form an emulsifiable concentration. It is diluted with water for actual application ["Kawakazol": aliphatic hydrocarbons with high boiling point, "Sorpol": polyoxyethylenealkylarylether].

EXAMPLE 7

10 parts of Compound 30, 10 parts of bentonite, 78 parts of talc and 2 parts of lignin sulfonate are formed into a mixture and it is intimately mixed with 25 parts of water. The mixture is finely divided by means of an extruding granulator to give particles of 20–40 mesh, followed by drying at 40–50° C.

EXAMPLE 8

2 parts of Compound 27 and 98 parts of a mixture of talc and clay were ground and mixed together to form a dust [talc and clay (3:1)].

Note.—The term "parts" used in the Examples 5 to 8 means weight.

EXAMPLE 9

Preparation of test compound

Solvent: 3 parts by weight of dimethylformamide
Emulsifier: 0.1 part by weight of alkyl aryl polyglycol ether.

In order to prepare a suitable preparation of an active compound, one part by weight of the active compound is mixed with the above amount of the solvent containing the above amount of the emulsifier, and the mixture is diluted with water to form an aqueous preparation containing the active compound at a prescribed concentration.

Test of effects against the housefly

Test procedure.—1 ml. of an aqueous preparation containing the active compound at a prescribed concentration, which is prepared according to the above-mentioned method, is dropped onto a filter paper in a 9 cm. diameter Petri dish. Then 10 female mature houseflies are put in the dish which is kept in a thermostat chamber maintained at 28° C. After 24 hours have passed, the number of dead flies is counted and the killing ratio is calculated.

The test results are shown in Table 2.

TABLE 2

| Compound number: | Killing ratio (percent) at an active ingredient concentration of— | |
|---|---|---|
| | 0.1% | 0.01% |
| 1 | 100 | 70 |
| 2 | 100 | 80 |
| 3 | 100 | 100 |
| 4 | 100 | |
| 5 | 100 | 80 |
| 6 | 100 | |
| 7 | 100 | |
| 8 | 100 | |
| 9 | 100 | 90 |
| 11 | 100 | |
| 12 | 100 | |
| 15 | 100 | |
| 16 | 100 | 100 |
| 17 | 100 | |
| 18 | 100 | 100 |
| 19 | 100 | |
| 21 | 100 | |
| 24 | 100 | |
| 27 | 100 | |
| 30 | 100 | |
| A (comparison) | 0 | |
| Un-treated (control) | 0 | |

NOTES:
1. A = O-ethyl-S-(2-ethylthioethyl)-O-4-chlorophenyl phosphorothiolate (Dutch Patent No. 68/6844).
2. The compound numbers in the table correspond to those in Examples 1, 2 and 3 and Table 1.

EXAMPLE 10

Test of effects against the Azuki bean weevil (*Callosobruchus chinensis*)

Test procedure.—20 Azuki bean weevils are dipped for 1 minute in an aqueous preparation, prepared as in Example 9, containing the active compound at a prescribed concentration, and they are then put in a Petri dish covered with a filter paper. The Petri dish is allowed to stand for 24 hours in a thermostat chamber at 28° C. The number of dead weevils is counted and the killing ratio is calculated.

The test results are shown in Table 3.

TABLE 3

| Compound number: | Killing ratio (percent) at an active ingredient concentration of— | |
|---|---|---|
| | 0.1% | 0.01% |
| 1 | 100 | 100 |
| 2 | 100 | 100 |
| 3 | 100 | 100 |
| 4 | 100 | 100 |
| 5 | 100 | 100 |
| 6 | 100 | 100 |
| 8 | 100 | |
| 9 | 100 | 100 |
| 11 | 100 | |
| 12 | 100 | |
| 14 | 100 | |
| 15 | 100 | |
| 16 | 100 | |
| 17 | 100 | |
| 18 | 100 | |
| 24 | 100 | |
| 27 | 100 | |
| 28 | 100 | |
| 29 | 100 | |
| 30 | 100 | |
| Un-treated (control) | 0 | |

EXAMPLE 11

Test of effects against tobacco cutworm (*Prodenia litura*) larvae

Test procedure.—Sweet-potato leaves are dipped in the preparation prepared as in Example 9, containing the active compound at the prescribed concentration, dried in air and placed in a 9 cm. diameter Petri dish. Then 10 third-instar tobacco cutworm larvae are put in the dish and the dish is kept in a thermostat chamber maintained at 28° C. After 24 hours have passed, the number of the dead larvae is counted and the killing ratio is calculated.

The test results are shown in Table 4.

TABLE 4

| Compound number: | Killing ratio (percent) at an active ingredient concentration of— | | |
|---|---|---|---|
| | 0.1% | 0.03% | 0.01% |
| 1 | 100 | 100 | 100 |
| 2 | 100 | 100 | 100 |
| 3 | 100 | 100 | 100 |
| 4 | 100 | 100 | 100 |
| 5 | 100 | 100 | |
| 6 | 100 | 100 | 100 |
| 7 | 100 | 100 | |
| 8 | 100 | 100 | 100 |
| 9 | 100 | 100 | |
| 10 | 100 | 100 | 100 |
| 11 | 100 | 100 | |
| 12 | 100 | 100 | |
| 13 | 100 | 100 | |
| 14 | 100 | 100 | |
| 15 | 100 | 100 | |
| 16 | 100 | 100 | 100 |
| 17 | 100 | 100 | |
| 18 | 100 | 100 | |
| 19 | 100 | 100 | |
| 20 | 100 | 100 | |
| 21 | 100 | 100 | |
| 22 | 100 | 100 | |
| 23 | 100 | 100 | |
| 24 | 100 | 100 | |
| 25 | 100 | 100 | |
| 26 | 100 | 100 | |
| 27 | 100 | 100 | 100 |
| 28 | 100 | 100 | |
| 29 | 100 | 100 | 100 |
| 30 | 100 | 100 | |
| 31 | 100 | 100 | 100 |
| (A) (comparison) | 0 | | |
| Sumithion (comparison)[1] | 100 | 90 | 10 |

[1] Sumithion is O,O-dimethyl-O-(3-methyl-4-nitrophenyl) phosphorothioate.

EXAMPLE 12

Test of effects against the brown planthopper (*Nelaparvata lugens*)

Test procedure.—An aqueous preparation containing the active compound at a prescribed concentration, which is prepared in the same manner as in Example 9, is sprayed onto 10 cm. high rice seedlings, each planted in a 12 cm. diameter pot, in an amount of 10 ml. per pot. After the sprayed liquor has dried, the pot is covered with a cylindrical wire cage of 7 cm. diameter and 14 cm. height, into which 30 female mature brown planthoppers are put. The pot is allowed to stand in a thermostat chamber for 24 hours at 28° C. and the number of the dead planthoppers is counted and the killing ratio is calculated.

The test results are shown in Table 5.

TABLE 5

| Compound No.: | Killing ratio (percent)/active ingredient concentration, 0.05% |
|---|---|
| 1 | 100 |
| 2 | 100 |
| 3 | 96.6 |
| 5 | 94.1 |
| 6 | 96.7 |
| 7 | 96.8 |
| 8 | 97.8 |
| 9 | 96.4 |

TABLE 5—Continued

| Compound No.: | Killing ratio (percent)/active ingredient concentration, 0.05% |
|---|---|
| 11 | 90.3 |
| 12 | 97.1 |
| 14 | 100 |
| 15 | 90.5 |
| 16 | 95.8 |
| 17 | 83.8 |
| 18 | 82.1 |
| 19 | 66.7 |
| 21 | 75.0 |
| 24 | 60.8 |
| 27 | 91.4 |
| 29 | 100 |
| 30 | 100 |
| Malathion [1] (comparison) | 57.2 |

[1] Malathion is O,O-dimethyl - S - (1,2-dicarboethoxyethyl) dithiophosphate.

EXAMPLE 13

Test on effects against the carmine mite
(*Tetranychus telarius*)

Test procedure.—A kidney-bean plant having two developing leaves and planted in a 6 cm. diameter pot is infected with 50–100 carmine mite imagines and nymphs. Two days after the infection, an aqueous preparation containing the active compound at a prescribed concentration, which is prepared in the same manner as in Example 9, is sprayed in an amount of 40 ml. per pot. Each pot is kept in a greenhouse for 10 days and the control effect is evaluated. The evaluation is expressed by the index rated on the following scale.

Index:
- 3: no living imago or nymph
- 2: less than 5% of living imagines and nymphs based on the untreated control
- 1: 5–50% of living imagines and nymphs based on on the untreated control
- 0: more than 50% of living imagines and nymphs based on the untreated control.

The test results are shown in Table 6.

TABLE 6

| | Active ingredient concentration of— | |
|---|---|---|
| | 0.03% | 0.01% |
| Compound number: | | |
| 2 | 3 | 2 |
| 4 | 3 | 3 |
| 9 | 3 | 3 |
| 15 | 3 | 2 |
| 16 | 3 | 3 |
| 19 | 3 | 2 |
| 26 | 3 | 2 |
| 27 | 3 | 3 |
| 30 | 3 | 3 |
| (A) (Comparison) | 1 | 0 |
| Phenkaptone (comparison)[1] | 3 | 1 |

[1] Phenkaptone is O,O-diethyl-S-(2,5-dichlorophenylthiomethyl)-dithiophosphate.

It will be appreciated that the instant specification and examples are set forth by way of illustration and not limitation and that various modifications and changes may be made without departing from the spirit and scope of the present invention.

What is claimed is:

1. Phosphoric acid esters of the general formula

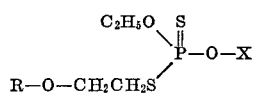

in which
R is a lower alkyl radical, and
X is a group of the formula

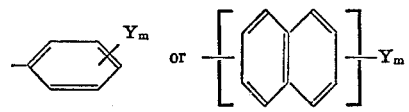

in which
Y is a halogen atom or a lower alkyl, lower alkoxy, nitro, or phenyl group, and
m is 0, 1, 2 or 3.

2. Compound according to claim 1 in which Y is a chlorine or bromine atom, a nitro, or phenyl group or a $C_1$-$C_4$ alkyl or $C_1$-$C_4$ alkoxy group.

3. Compound according to claim 1 wherein such compound is O-ethyl - O - phenyl - S - (2 - ethoxyethyl)-phosphorothionothiolate of the formula

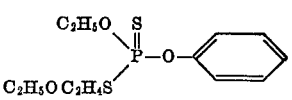

4. Compound according to claim 1 wherein such compound is O-ethyl - O - (4 - chlorophenyl) - S - (2-ethoxyethyl)-phosphorothionothiolate of the formula

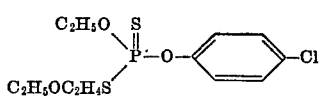

5. Compound according to claim 1 wherein such compound is O-ethyl - O - (2,4-dichlorophenyl)-S-(2-methoxyethyl)-phosphorothionothiolate of the formula

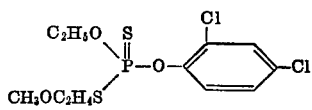

6. Compound according to claim 1 wherein such compound is O-ethyl - O - (2,4-dichlorophenyl)-S-(2-ethoxyethyl)-phosphorothionothiolate of the formula

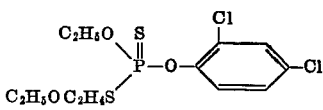

7. Compound according to claim 1 wherein such compound is O-ethyl - O - (2,4-dichlorophenyl)-S-(2-iso-propoxyethyl)-phosphorothionothiolate of the formula

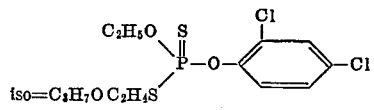

8. Compound according to claim 1 wherein such compound is O-ethyl-O-(2,4,5 - trichlorophenyl)-S-(2-ethoxyethyl)-phosphorothionothiolate of the formula

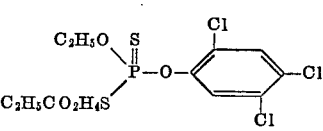

9. Compound according to claim 1 wherein such compound is O-ethyl - O - (4-bromophenyl) - S - (2-ethoxyethyl)-phosphorothionothiolate of the formula

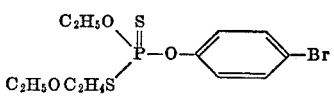

10. Compound according to claim 1 wherein such compound is O-ethyl - O - (4-nitrophenyl) - S - (2-ethoxyethyl)-phosphorothionothiolate of the formula

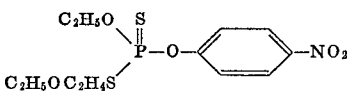

11. Compound according to claim 1 wherein such compound is O-ethyl - O - (α - naphthyl) - S - (2 - ethoxyethyl)-phosphorothionothiolate of the formula

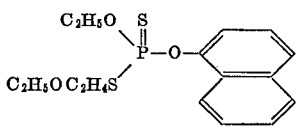

References Cited
FOREIGN PATENTS
624,475    9/1961    Italy _____ 260—952

LEWIS GOTTS, Primary Examiner
R. L. RAYMOND, Assistant Examiner

U.S. Cl. X.R.
260—940, 949; 424—210, 216, 217